United States Patent
Ogren (10) Patent No.: US 10,150,274 B1
(45) Date of Patent: Dec. 11, 2018

(54) ASSEMBLY FOR CREATING CUSTOM OBJECTS WITH ADHESIVE FROM PRINTABLE BLANK SHEETS

(71) Applicant: Blank Acquisition, LLC, Brooklyn Park, MN (US)

(72) Inventor: Andrew R. Ogren, Woodbury, MN (US)

(73) Assignee: Blank Acquisition, LLC, Brooklyn Park, MN (US)

( * ) Notice: Subject to any disclaimer, the term of this patent is extended or adjusted under 35 U.S.C. 154(b) by 0 days.

(21) Appl. No.: 15/692,761

(22) Filed: Aug. 31, 2017

(51) Int. Cl.
*B32B 7/12* (2006.01)
*B32B 25/06* (2006.01)
*B32B 7/06* (2006.01)

(52) U.S. Cl.
CPC .............. *B32B 7/06* (2013.01); *B32B 7/12* (2013.01); *B32B 25/06* (2013.01); *Y10T 428/14* (2015.01)

(58) Field of Classification Search
CPC .. B32B 3/266; B32B 7/14; B32B 7/06; B32B 27/304; B32B 27/32; B32B 27/36; B32B 27/10; B32B 2451/00; B32B 2439/62; B32B 2307/518; B32B 2307/748; B32B 2307/75; B41F 21/00; Y10T 428/14; Y10T 428/15
See application file for complete search history.

(56) References Cited

U.S. PATENT DOCUMENTS

| | | |
|---|---|---|
| 3,598,303 A | 8/1971 | Folz |
| 4,544,590 A | 10/1985 | Egan |
| 4,691,858 A | 9/1987 | Peer, Jr. |
| 4,735,356 A | 4/1988 | Engel |
| 5,071,062 A | 12/1991 | Bradley et al. |
| 5,141,485 A | 8/1992 | Welt |
| 5,219,183 A | 6/1993 | McKillip |
| 5,462,488 A | 10/1995 | McKillip |
| 5,466,013 A | 11/1995 | Garrison |
| 5,538,288 A | 7/1996 | Heath |
| 5,571,587 A | 11/1996 | Bishop et al. |
| 5,589,025 A | 12/1996 | Garrison |
| 5,595,403 A | 1/1997 | Garrison |
| 5,736,212 A | 4/1998 | Fischer |

(Continued)

FOREIGN PATENT DOCUMENTS

GB 2447615 A 9/2008

OTHER PUBLICATIONS

Promotional Products You Can Print on | Blanks/USA, http://www.blanksusa.com/products/promotional-products Jun. 20, 2014, 2 pages.

(Continued)

*Primary Examiner* — Patricia L. Nordmeyer
(74) *Attorney, Agent, or Firm* — Kinney & Lange, P.A.

(57) ABSTRACT

A printable blank sheet includes a sheet layer, a dry lift strip extending along a bottom of the sheet layer, an adhesive strip extending along the bottom of the sheet layer adjacent the dry lift strip, and cut lines in the printable blank sheet that define a periphery of an object in the printable blank sheet. The dry lift strip includes a pressure sensitive adhesive layer connected to the sheet layer, a film layer connected to the pressure sensitive adhesive layer, a dry lift adhesive layer connected to the film layer, and a backing film layer connected to the dry lift adhesive layer. The adhesive strip includes an adhesive layer connected to the sheet layer and a cover layer connected to the adhesive layer.

24 Claims, 8 Drawing Sheets

(56) References Cited

U.S. PATENT DOCUMENTS

| | | |
|---|---|---|
| 5,782,497 A | 7/1998 | Casagrande |
| 5,797,304 A | 8/1998 | Sterr et al. |
| 5,842,722 A | 12/1998 | Carlson |
| 5,853,837 A | 12/1998 | Popat |
| 5,890,743 A | 4/1999 | Garrison et al. |
| 6,016,618 A | 1/2000 | Attia et al. |
| 6,022,051 A | 2/2000 | Casagrande |
| 6,117,061 A | 9/2000 | Popat et al. |
| 6,193,457 B1 | 2/2001 | Pacione |
| 6,257,404 B1 | 7/2001 | Tracy et al. |
| 6,279,821 B1 | 8/2001 | Kubitsky et al. |
| 6,290,261 B1 | 9/2001 | Waggoner et al. |
| 6,294,237 B1 | 9/2001 | Popat |
| 6,328,340 B1 | 12/2001 | Fischer |
| 6,358,587 B1 | 3/2002 | Saint et al. |
| 6,440,050 B1 | 8/2002 | Capparelli et al. |
| 6,581,971 B1 | 6/2003 | MacWilliams |
| 6,585,845 B1 | 7/2003 | Peterson |
| 6,837,955 B1 | 1/2005 | McCarthy et al. |
| 6,845,864 B2 | 1/2005 | Taw et al. |
| 6,966,483 B2 | 11/2005 | Manninen |
| 6,991,259 B2 | 1/2006 | Schwarzbauer et al. |
| 6,991,839 B2 | 1/2006 | Maier |
| 7,153,254 B2 | 12/2006 | Cordes |
| 7,165,713 B2 | 1/2007 | Allee |
| 7,260,907 B2 | 8/2007 | Sturba et al. |
| 7,322,613 B2 | 1/2008 | Penuela et al. |
| 7,579,076 B2 | 8/2009 | Ishikawa |
| 7,658,993 B2 | 2/2010 | Dronzek, Jr. et al. |
| 7,784,209 B2 | 8/2010 | Greer |
| 8,507,064 B2 | 8/2013 | McCarthy et al. |
| 8,524,141 B2 | 9/2013 | Utz et al. |
| 8,528,940 B1 | 9/2013 | Valenti, Jr. et al. |
| 8,530,020 B2 | 9/2013 | McCarthy et al. |
| 9,330,579 B2 | 5/2016 | Weinstein |
| 9,469,082 B2 | 10/2016 | Carroll |
| 9,613,547 B2 | 4/2017 | Weiner et al. |
| 9,833,971 B2 | 12/2017 | Ogren |
| 2001/0007703 A1 | 7/2001 | Weirather et al. |
| 2002/0187285 A1 | 12/2002 | Mitchell et al. |
| 2003/0138598 A1 | 7/2003 | Rawlings |
| 2003/0177681 A1 | 9/2003 | Riley |
| 2005/0082356 A1 | 4/2005 | Shadrach |
| 2005/0123705 A1 | 6/2005 | Dronzek, Jr. et al. |
| 2005/0156017 A1 | 7/2005 | Crum et al. |
| 2007/0114789 A1 | 5/2007 | Morrish |
| 2008/0000118 A1 | 1/2008 | Suzuki |
| 2008/0138556 A1 | 6/2008 | Emmert et al. |
| 2010/0038897 A1 | 2/2010 | Porter |
| 2011/0098168 A1 | 4/2011 | Best et al. |
| 2011/0212286 A1 | 9/2011 | Lund |
| 2013/0145663 A1 | 6/2013 | Greer |
| 2014/0069994 A1 | 3/2014 | Carroll |
| 2015/0266261 A1 | 9/2015 | Carroll |
| 2016/0015197 A1 | 1/2016 | Jacobs |
| 2016/0293061 A1 | 10/2016 | Becker et al. |
| 2016/0347018 A1 | 12/2016 | Carroll |
| 2017/0001408 A1 | 1/2017 | Carroll |
| 2017/0057202 A1 | 3/2017 | Ogren |
| 2017/0232707 A1 | 8/2017 | Ogren |
| 2018/0072038 A1 | 3/2018 | Ogren |

OTHER PUBLICATIONS

Dimensional | Mohawk Connects, http://www.mohawkconnects.com/products/digital/mohawk-dimensional, Jun. 20, 2014, 2 pages.

Light Fab Fold-Ups—lightfab.com—Fold, Ups, Ups, Fold Ups, Foldup . . . , http://lightfab.com/products/Light_Fab_Fold_Ups, Jun. 20, 2014, 1 page.

Relyco Business Solutions—Relyco Digipop Custom Digital Packaging . . . , http://www.relyco.com/indes.php/products/digipop-packaging-solutions, Jun. 20, 2014, 8 pages.

Relyco, DigiPOP Packaging Solutions, http://www.relyco.com/en/Products/DigiPOP%20Packaging%Solutions.aspx, May 21, 2012, 16 pages.

ASSEMBLY FOR CREATING CUSTOM OBJECTS WITH ADHESIVE FROM PRINTABLE BLANK SHEETS

BACKGROUND

The present invention relates to printable blank sheets, and in particular, to printable blank sheets that contain an object with adhesive.

Custom print materials have become a common way for businesses to market themselves. Custom print materials that are typically used in advertising include two-dimensional products like postcards, flyers, and door hangers, as well as three-dimensional products like golf ball boxes, candy boxes and pop-up calendars. Typically, custom print materials are sent to print shops that specialize in preparing custom print materials, as the materials have had to be printed and assembled by specialized machines. As a result, having custom print materials made can be costly and time-consuming. Further, specialty print shops typically require custom print materials to be ordered in large amounts.

Some printable blank templates are currently available for creating custom print materials without having to send them to print shops. These templates are die-cut with perforations and scored lines. The perforations surround the desired shape of the object and the scored lines indicate where the object should be folded if the object is a three-dimensional structure. The drawback to the currently available die-cut templates is that it is hard to detach the desired object from the excess sheet when the objects have an intricate shape. Trying to separate the perforated lines often causes tearing of the object, which affects the strength and image of the resulting structure. The perforations surrounding the object can also leave rough edges on the structure where the perforations were torn apart. Further, it is time consuming to remove the objects from the sheet, especially if taking care not to tear the object as it is removed from the sheet.

SUMMARY

A printable blank sheet includes a sheet layer, a dry lift strip extending along a bottom of the sheet layer, an adhesive strip extending along the bottom of the sheet layer adjacent the dry lift strip, and cut lines in the printable blank sheet that define a periphery of an object in the printable blank sheet. The dry lift strip includes a pressure sensitive adhesive layer connected to the sheet layer, a film layer connected to the pressure sensitive adhesive layer, a dry lift adhesive layer connected to the film layer, and a backing film layer connected to the dry lift adhesive layer. The adhesive strip includes an adhesive layer connected to the sheet layer and a cover layer connected to the adhesive layer.

A method of creating a custom print object includes running a printable blank sheet through a printer. The printable blank sheet includes a sheet layer, a dry lift strip extending along a bottom of the sheet layer, an adhesive strip extending along the bottom of the sheet layer adjacent the dry lift strip, and cut lines in the printable blank sheet that define a periphery of an object in the printable blank sheet. The dry lift strip includes a pressure sensitive adhesive layer connected to the sheet layer, a film layer connected to the pressure sensitive adhesive layer, a dry lift adhesive layer connected to the film layer, and a backing film layer connected to the dry lift adhesive layer. The adhesive strip includes an adhesive layer connected to the sheet layer and a cover layer connected to the adhesive layer. The method also includes separating the object from the backing film layer along the dry lift adhesive layer and separating the object from the cover layer.

DETAILED DESCRIPTION

In general, the present disclosure describes a printable blank sheet that has a top layer made up of a sheet layer. A dry lift strip that includes a pressure sensitive adhesive layer, a film layer, a dry lift adhesive layer, and a backing film layer is connected to a bottom of a dry lift portion of the sheet layer. An adhesive strip that includes an adhesive layer and a cover layer is connected to the bottom of an adhesive portion of the sheet layer adjacent the dry lift strip. The thickness of the dry lift strip is about equal to the thickness of the adhesive strip, reducing or eliminating stack bias of the printable blank sheets. Additionally, the printable blank sheet includes cut lines that define objects. The objects can be removed from the printable blank sheet by separating them from the backing film layer and the cover layer. As a result, the object has clean edges with a laminated portion that is free from adhesive and an adhesive portion.

Figure 1A:
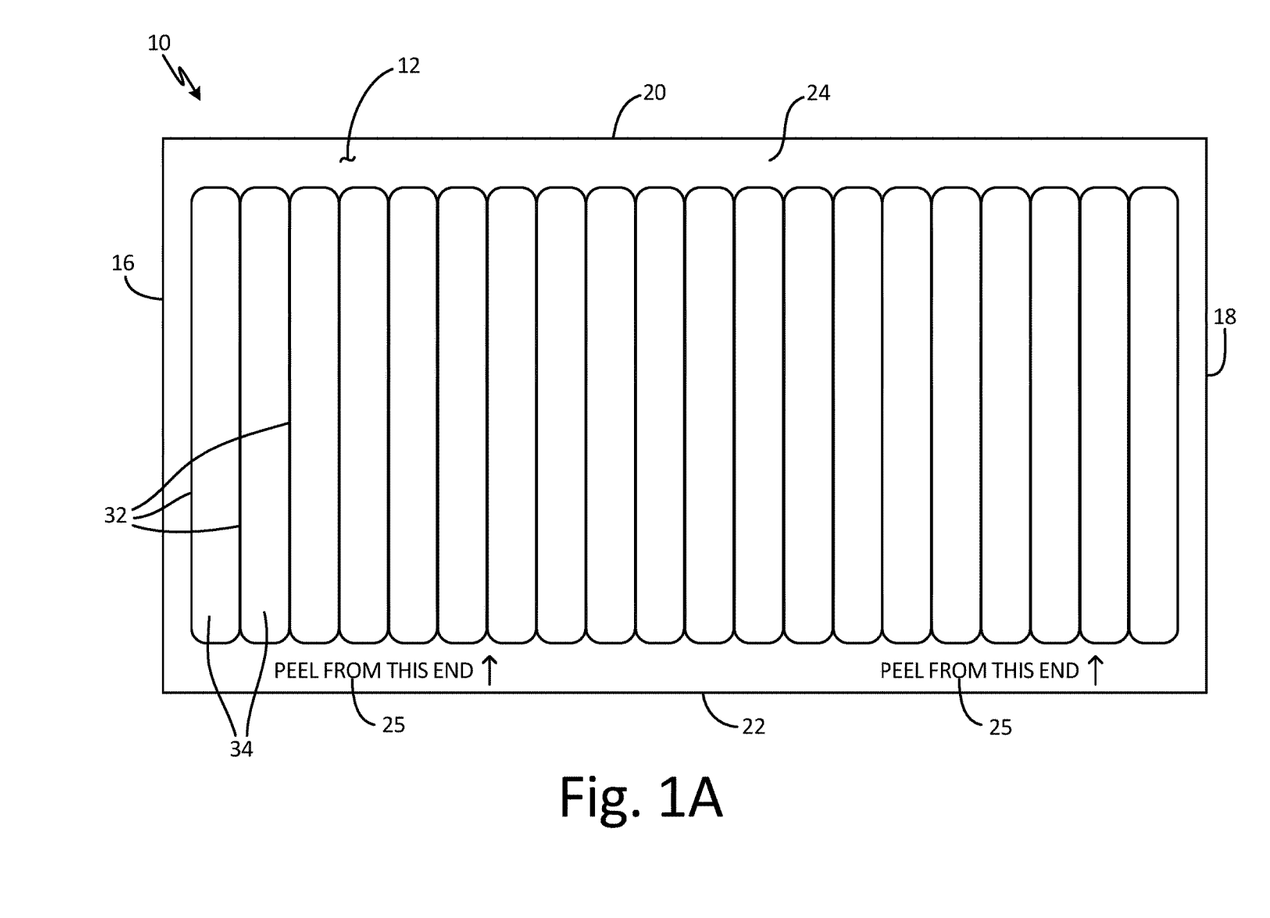
FIG. 1A is a top view of a printable blank sheet.
Figure 1B:
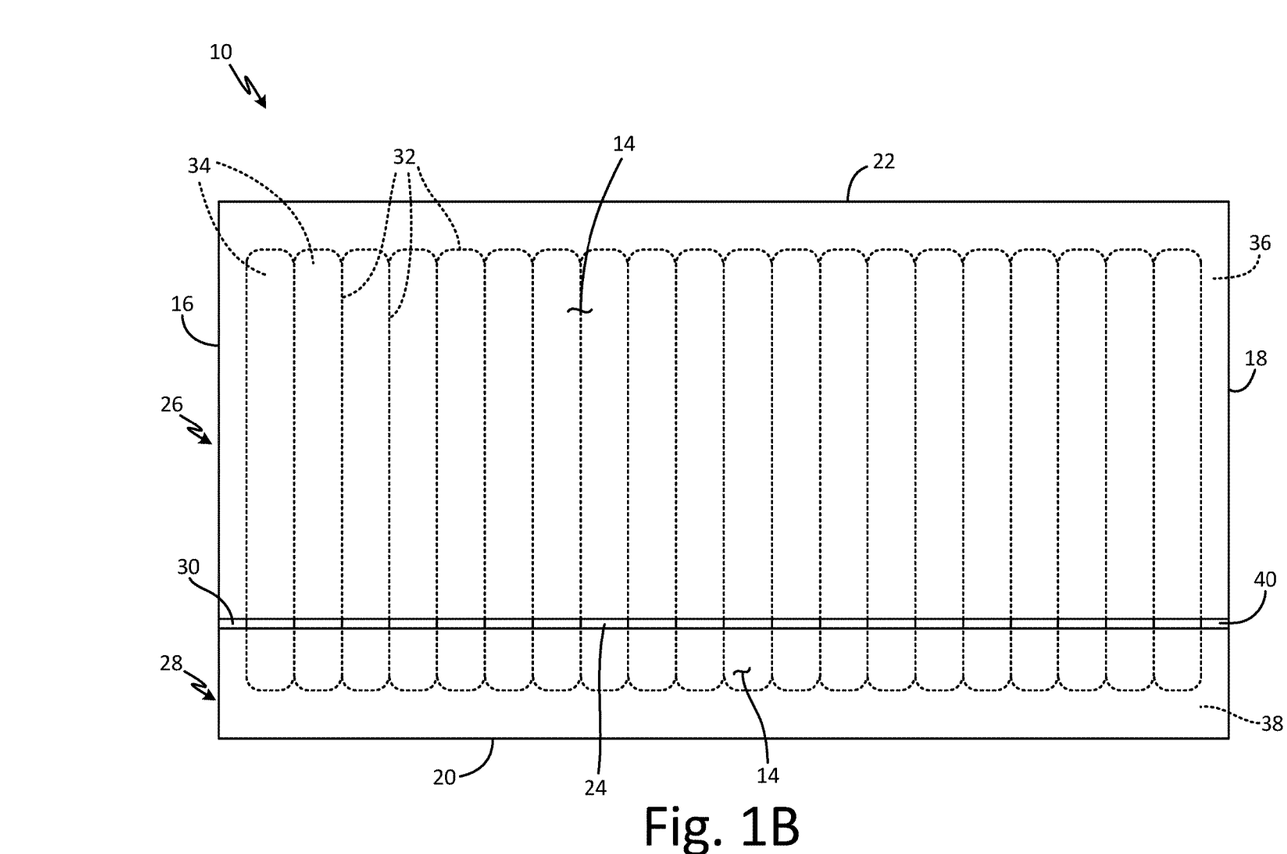
FIG. 1B is a bottom view of the printable blank sheet.

FIG. 1A is a top view of printable blank sheet 10. FIG. 1B is a bottom view of printable blank sheet 10. FIGS. 1A and 1B will be discussed together. Printable blank sheet 10 includes top surface 12 (shown in FIG. 1A), bottom surface 14 (shown in FIG. 1B), first end 16, second end 18, first side 20, second side 22, sheet layer 24, indicia 25 (shown in FIG. 1A), dry lift strip 26 (shown in FIG. 1B), adhesive strip 28 (shown in FIG. 1B), gap 30 (shown in FIG. 1B), cut lines 32, and objects 34. Sheet layer 24 includes dry lift portion 36, adhesive portion 38, and gap portion 40.

Printable blank sheet 10 is a flat sheet that has top surface 12 at a top of printable blank sheet 10 and bottom surface 14 at a bottom of printable blank sheet 10. Top surface 12 is capable of being printed on. Printable blank sheet 10 has first end 16 at one end of top surface 12 and bottom surface 14, and second end 18 at the other end of top surface 12 and bottom surface 18. First side 20 extends from first end 16 to second end 18 of printable blank sheet 10 and makes up one side of printable blank sheet 10. Second side 22 extends from first end 16 to second end 18 of printable blank sheet 10 and makes up the other side of printable blank sheet 10. Sheet layer 24 is at a top of printable blank sheet 10. A top surface of sheet layer 24 makes up top surface 12 of printable blank sheet 10. In this embodiment, sheet layer 24 is a paper layer. In alternate embodiments, sheet layer 24 may be a synthetic material such as polyester (PET), polypropylene, vinyl, or any other suitable printable substrate. Indicia 25 are located on a top of sheet layer 24.

Dry lift strip 26 extends along a bottom of sheet layer 24. Dry lift strip 26 extends from first end 16 to second end 18 of printable blank sheet 10. In this embodiment, printable blank sheet 10 includes one dry lift strip 26. In alternate embodiments, printable blank sheet 10 may include more than one dry lift strip 26. Adhesive strip 28 extends along the bottom of sheet layer 24 adjacent dry lift strip 26. Adhesive strip 28 extends from first end 16 to second end 18 of printable blank 10. In this embodiment, printable blank sheet 10 includes one adhesive strip 28. In alternate embodiments, printable blank sheet 10 may include more than one adhesive strip 28. A bottom surface of dry lift strip 26 and a bottom surface of adhesive strip 28 make up bottom surface 14 of printable blank sheet 10. The thickness of dry lift strip 26 is equal or about equal to the thickness of adhesive strip 28. More specifically, the thickness of dry lift strip 26 differs from the thickness of adhesive strip 28 by 25 percent or less. For example, the thickness of dry lift strip 26 may be about 3.5 mils (0.0035 inch or 0.0889 millimeter) or between about 2 mils (0.002 inch or 0.0508 millimeter) and 10 mils (0.01 inch or 0.254 millimeter), and the thickness of adhesive strip 28 may be about 3.5 mils (0.0035 inch or 0.0889 millimeter) or between about 2 mils (0.002 inch or 0.0508 millimeter) and 10 mils (0.01 inch or 0.254 millimeter) plus or minus 25 percent. Gap 30 is between dry lift strip 26 and adhesive strip 28 and extends from first end 16 to second end 18 of printable blank sheet 10. Gap 30 can have a width of about zero to about 0.25 inch (6.35 millimeters). In alternate embodiments, printable blank sheet 10 does not include gap 30, and dry lift strip 26 abuts adhesive strip 28.

Cut lines 32 are located in printable blank sheet 10 between first end 16 and second end 18 and between first side 20 and second side 22. Cut lines 32 define a periphery of objects 34 in printable blank sheet 10. Cut lines 32 are die-cut lines. More specifically, cut lines 32 are kiss cuts that extend through sheet layer 24 and into portions of dry lift strip 26 and adhesive strip 28. Cut lines 32 do not extend through dry lift strip 26 and adhesive strip 28. As such, cut lines 32 do not reach bottom surface 14 of printable blank sheet 10. In this embodiment, objects 34 are wristbands. In alternate embodiments, objects 34 may be any suitable object.

Sheet layer 24 is made up of dry lift portion 36, adhesive portion 38 and gap portion 40. Sheet layer 24 has dry lift portion 36 that extends from first end 16 to second end 18 of printable blank sheet 10. Dry lift portion 36 is the portion of sheet layer 24 that dry lift strip 26 extends along. Indicia 25 are also located on dry lift portion 36 of sheet layer 24. In this embodiment, sheet layer 24 has one dry lift portion 36. In alternate embodiments, sheet layer 24 may include more than one dry lift portion 36. Sheet layer 24 has adhesive portion 38 that extends from first end 16 to second end 18 of printable blank sheet 10. Adhesive portion 38 is the portion of sheet layer 24 that adhesive strip 28 extends along. In this embodiment, sheet layer 24 has one adhesive portion 38. In alternate embodiments, sheet layer 24 may include more than one adhesive portion 38. Gap portion 40 of sheet layer 24 extends from first end 16 to second end 18 of printable blank sheet 10 between dry lift portion 36 and adhesive portion 38. Gap portion 40 is the portion of sheet layer 24 that gap 30 extends along. In this embodiment, sheet layer 24 has one gap portion 40. In alternate embodiments, sheet layer 24 may have no gap portion 40 or more than one gap portion 40.

Printable blank sheet 10 is produced by connecting dry lift strip 26 and adhesive strip 28 to the bottom of sheet layer 24. Printable blank sheet 10 is capable of being passed through a printer. Top surface 12 is capable of being printed on, allowing for custom printing of objects 34 in printable blank sheet 10. Objects 34 can then be removed from printable blank sheet 10 by peeling objects 34 out of printable blank sheet 10. Indicia 25 indicate where objects 34 should be lifted to be peeled out of printable blank sheet 10. Die-cut cut lines 32 result in objects with clean edges after they have been removed from printable blank sheet 10.

Printable blank sheet 10 enables individual customization of removable objects 34. As such, businesses can create their own custom printed marketing materials, which can save money and time compared to ordering custom printed marking materials from specialty print shops. Cut lines 32 and indicia 25 assist in quick and easy removal of objects 34 after objects 34 in printable blank sheet 10 have been custom printed. Cut lines 32 also produce objects with clean edges, making the objects more suitable for use as marketing materials. Additionally, the thickness of dry lift strip 26 being equal or about equal to the thickness of adhesive strip 28 reduces or eliminates stack bias of printable blank sheets 10. By reducing or removing stack bias, printable blank sheets 10 can be processed through a printer more quickly and are easier to store.

Figure 2A:
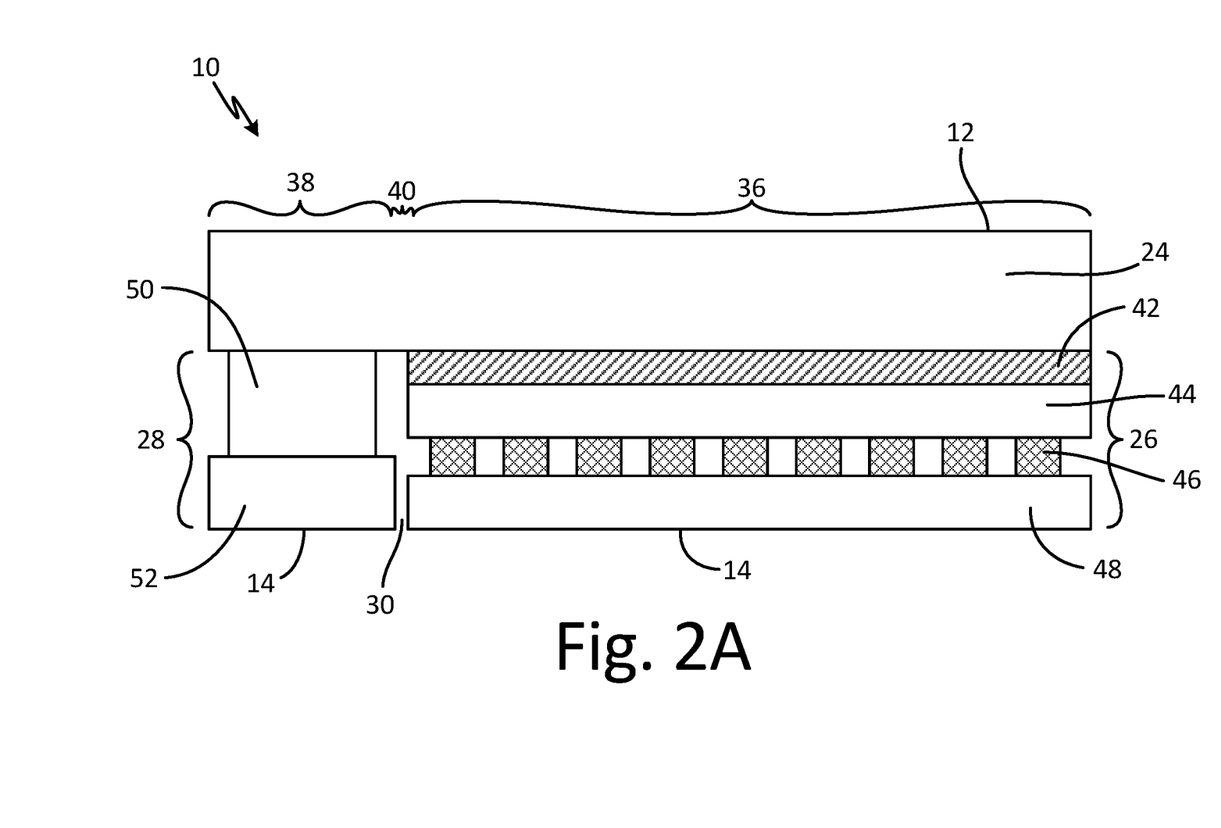
FIG. 2A is a side cross-sectional view of the printable blank sheet showing the dry lift strip and the adhesive strip of the printable blank sheet.
Figure 2B:
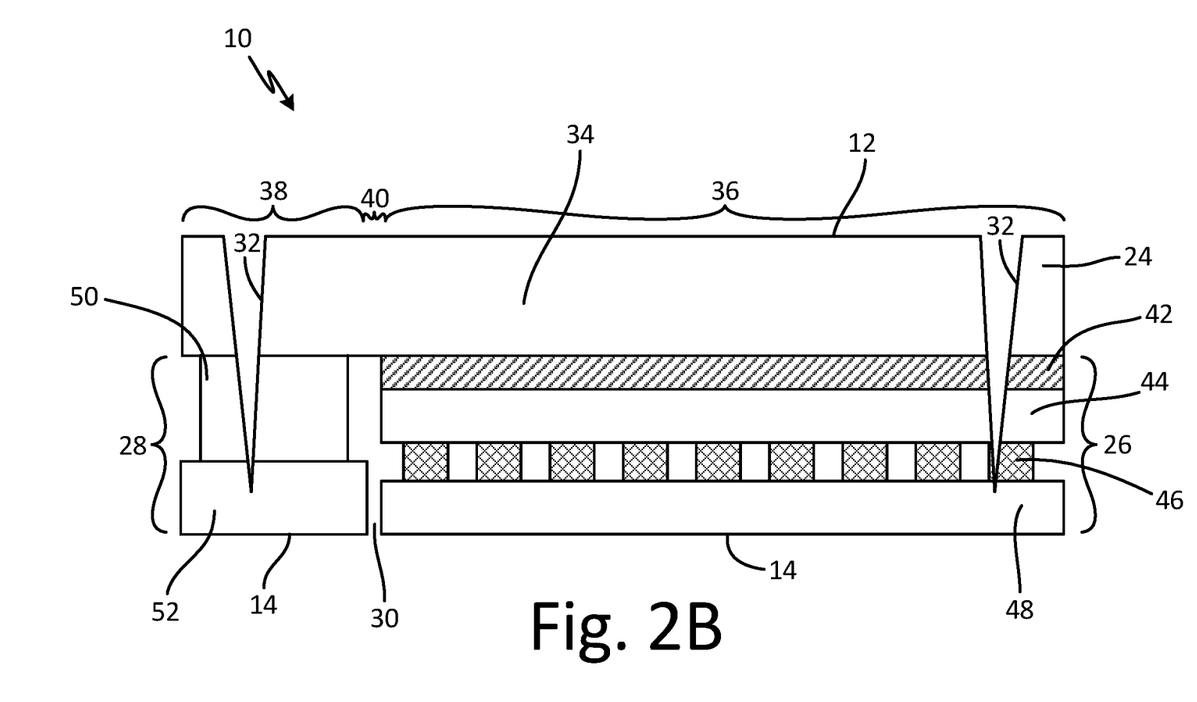
FIG. 2B is a side cross-sectional view of the printable blank sheet after it has been cut.
Figure 2C:
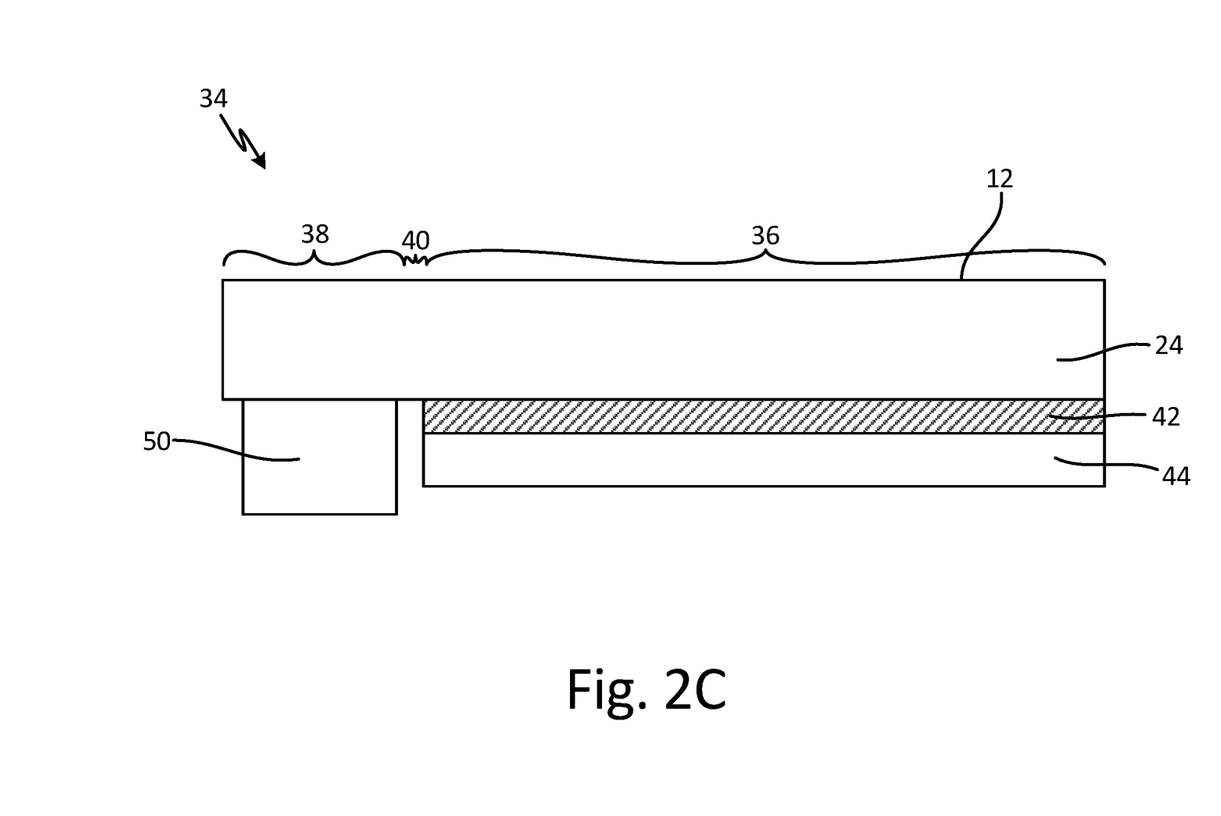
FIG. 2C is a side cross-sectional view of the object after it has been removed from the printable blank sheet.

FIG. 2A is a side cross-sectional view of printable blank sheet 10 showing dry lift strip 26 and adhesive strip 28 of printable blank sheet 10. FIG. 2B is a side cross-sectional view of printable blank sheet 10 after it has been cut. FIG. 2C is a side cross-sectional view of object 34 after it has been removed from printable blank sheet 10. FIGS. 2A, 2B, and 2C will be discussed together. Printable blank sheet 10 includes top surface 12, bottom surface 14 (shown in FIGS. 2A and 2B), sheet layer 24, dry lift strip 26 (shown in FIGS. 2A and 2B), adhesive strip 28 (shown in FIGS. 2A and 2B), gap 30 (shown in FIGS. 2A and 2B), cut lines 32 (shown in FIG. 2B), and object 34. Sheet layer 24 includes dry lift portion 36 (shown in FIGS. 2A and 2B), adhesive portion 38 (shown in FIGS. 2A and 2B), and gap portion 40. Dry lift strip 26 includes pressure sensitive adhesive layer 42, film layer 44, dry lift adhesive layer 46, and backing film layer 48. Adhesive strip 28 includes adhesive layer 50 and cover layer 52.

Printable blank sheet 10 has top surface 12 at a top of printable blank sheet 10 and bottom surface 14 at a bottom of printable blank sheet 10. Sheet layer 24 forms a top layer of printable blank sheet 10. A top of sheet layer 24 makes up top surface 12 of printable blank sheet 10. Dry lift strip 26 extends along a bottom of sheet layer 24. Adhesive strip 28 extends along the bottom of sheet layer 24 adjacent dry lift strip 26. A bottom surface of dry lift strip 26 and a bottom surface of adhesive strip 28 make up bottom surface 14 of printable blank sheet 10. Gap 30 is between dry lift strip 26 and adhesive strip 28. Cut lines 32 are located in printable blank sheet 10. Cut lines 32 define a periphery of objects 34 in printable blank sheet 10.

Sheet layer 24 has dry lift portion 36 that dry lift strip 26 extends along and adhesive portion 38 that adhesive strip 28 extends along. Sheet layer 24 has gap portion 40 between dry lift portion 36 and adhesive portion 38.

Dry lift strip 26 is made up of pressure sensitive adhesive layer 42, film layer 44, dry lift adhesive layer 46, and backing film layer 48. A top of pressure sensitive adhesive layer 42 is connected to a bottom of dry lift portion 36 of sheet layer 24. A bottom of pressure sensitive adhesive layer 42 is connected to a top of film layer 44. Pressure sensitive adhesive layer 42 connects film layer 44 to sheet layer 24. Pressure sensitive adhesive layer 42 is made up of a pressure activated adhesive that will form a bond between sheet layer 24 and film layer 44 when sheet layer 24, pressure sensitive adhesive layer 42, and film layer 44 are pressed together. Pressure sensitive adhesive layer 42 has a thickness between about 0.5 mil (0.0005 inch or 0.0127 millimeter) and about 2.0 mils (0.002 inch or 0.0508 millimeter). A bottom of film layer 44 is connected to a top of dry lift adhesive layer 46. In this embodiment, film layer 44 is biaxially oriented polypropylene (BOPP). In alternate embodiments, film layer 44 may be polyethylene (PE), polyester (PET), polyvinyl chloride (PVC), or any other suitable film. Film layer 44 has a thickness between about 0.5 mil (0.0005 inch or 0.0127 millimeter) and about 1.0 mil (0.001 inch or 0.0254 millimeter). A bottom of dry lift adhesive layer 46 is connected to a top of backing film layer 48. Dry lift adhesive layer 46 connects backing film layer 48 to film layer 44. Dry lift adhesive layer 46 is made up of a strong dry lift adhesive applied as a pattern so that areas of dead space are between areas of dry lift adhesive. Dry lift adhesive layer 46 has a dry release. Dry lift adhesive layer 46 has a thickness between about 0.25 mil (0.00025 inch or 0.00635 millimeter) and about 0.5 mil (0.0005 inch or 0.0127 millimeter). In this embodiment, backing film layer 48 is biaxially oriented polypropylene (BOPP). In alternate embodiments, backing film layer 48 may be polyethylene (PE), polyester (PET), polyvinyl chloride (PVC), or any other suitable film. Backing film layer 48 has a thickness between about 0.5 mil (0.0005 inch or 0.0127 millimeter) and about 5.0 mils (0.005 inch or 0.127 millimeter). Pressure sensitive adhesive layer 42, film layer 44, dry lift adhesive layer 46, and backing film layer 48 of dry lift strip 26 may all be the same length and may all be the same width. In alternate embodiments, pressure sensitive adhesive layer 42, film layer 44, dry lift adhesive layer 46, and backing film layer 48 may have different lengths and widths. Cut lines 32 that extend through dry lift portion 36 extend through sheet layer 24, pressure sensitive adhesive layer 42, film layer 44, and dry lift adhesive layer 46, as illustrated in FIG. 2B. Cut lines 32 may extend a short distance into backing film layer 48, but cut lines 32 do not extend through backing film layer 48.

Adhesive strip 28 is made up of adhesive layer 50 and cover layer 52. A top of adhesive layer 50 is connected to a bottom of adhesive portion 38 of sheet layer 24. A bottom of adhesive layer 50 is connected to a top of cover layer 52. Adhesive layer 50 connects cover layer 52 and sheet layer 24. Adhesive layer 50 can square, rectangular, oval, or any suitable shape. For example, adhesive layer 50 can be comprised of a strip of shapes, such as a strip of circles of adhesive. Adhesive layer 50 may be acrylic or any other suitable adhesive. For example, adhesive layer 50 may be removable adhesive, permanent adhesive, or water-proof adhesive. Adhesive layer 50 has a thickness between about 0.25 mil (0.00025 inch or 0.00635 millimeter and about 8 mils (0.008 inch or 0.2032 millimeter). Adhesive layer 50 and cover layer 52 may be the same length. In this embodiment, cover layer 52 is wider than adhesive layer 50. As such, portions of cover layer 52 are not in contact with adhesive layer 50 as portions of cover layer 52 extend past adhesive layer 50. In alternate embodiments, adhesive layer 50 and cover layer 52 are the same width. Adhesive layer 50 may be thicker than cover layer 52. Cover layer 52 may be a synthetic material such as polyester (PET) or any other suitable film layer. Cover layer 52 has a thickness between about 1.0 mil (0.001 inch or 0.0254 millimeter) to about 6.0 mils (0.006 inch or 0.1524 millimeter). Cut lines 32 that extend through adhesive portion 38 extend through sheet layer 24 and adhesive layer 50, as illustrated in FIG. 2B. Cut lines 32 may extend a short distance into cover layer 52, but cut lines 32 do not extend through cover layer 52. A bottom surface of backing film layer 48 and a bottom surface of cover layer 52 make up bottom surface 14 of printable blank sheet 10.

Printable blank sheet 10 is produced by pressing dry lift strip 26 and adhesive strip 28 along the bottom of sheet layer 24. Web guides, optical registration, or other devices are used to align the dry lift strip 26 and adhesive strip 28 such that gap 30 is formed between dry lift strip 26 and adhesive strip 28 or dry lift strip 26 abuts adhesive strip 28. Cut lines 32 are die-cut into printable blank sheet 10 to define a periphery of objects 34.

Printable blank sheet 10 is run through a printer to custom print on objects 34. Objects 34 can be removed from printable blank sheet 10 after printing. More specifically, objects 34 can be removed first from dry lift portion 36 of sheet 24 by separating object 34 from backing film layer 48 of dry lift strip 26 along dry lift adhesive layer 46 of dry lift strip 26. The pattern of dry lift adhesive layer 46 allows a portion of object 34 to be lifted in an area that has a dead space and then pulled up and away from backing film layer 48. Because dry lift adhesive layer 46 has a dry release, a portion of object 34 having dry lift portion 36 of sheet 24, as well as backing film layer 48, will be free from sticky residue after object 34 has been separated from backing film layer 48. A majority of dry lift adhesive from dry lift adhesive layer 46 will remain on backing film layer 48 when object 34 is removed from backing film layer 48. Any dry lift adhesive from dry lift adhesive layer 46 that remains on object 34 will be undetectable. Indicia 25 (shown in FIG. 1A) serve to indicate that object 34 should be removed beginning with the portion of object 34 having dry lift portion 36 of sheet 24. Film layer 44 of dry lift strip 26 becomes the bottom surface of the portion of object 34 having dry lift portion 36 after object 34 has been removed from printable blank sheet 10, as illustrated in FIG. 2C. Object 34 can then be removed from adhesive portion 38 of sheet 24 by separating object 34 from cover layer 52 of adhesive strip 28 as object 34 is pulled away from printable blank sheet 10. Adhesive layer 50 becomes the bottom surface of the portion of object 34 having adhesive portion 38 after object 34 has been removed from printable blank sheet 10, as illustrated in FIG. 2C. As such, adhesive layer 50 is exposed. Exposed adhesive layer 50 on object 34 can be in the shape of a square, a rectangle, a circle, or any other suitable shape. Further, when printable blank sheet 10 includes multiple objects 34, one object 34 can be removed from printable blank sheet 10 while other objects 34 can remain stored in printable blank sheet 10. Adhesive layer 50 of object 34 can be adhered to another portion of object 34, such as top surface 12 of dry lift portion 36 of sheet layer 24, or to any other surface.

Printable blank sheet 10 has reduced or zero stack bias because dry lift strip 26 and adhesive strip 28 have about the same thickness or 25 percent or less difference in thickness. Further, pressure sensitive adhesive layer 42, film layer 44, dry lift adhesive layer 46 and backing film layer 48 of dry lift strip 26 can have the same length and width; and adhesive layer 50 and cover layer 52 of adhesive strip 28 can have the same length. Thus, production and processing of printable blank sheets 10 is quicker and easier. Printable blank sheets 10 are also easier to store. Because cut lines 32 do not extend through backing film layer 48 or cover layer 52, objects 34 are held in printable blank sheet 10 as printable blank sheet 10 is passed through a printer. Dry lift adhesive layer 46 also holds objects 34 in printable blank sheet 10 as printable blank sheet 10 is sent through a printer, allowing for cut lines 32 to be die-cut and surround an entire periphery of each object 34. As a result, objects 34 have clean edges after being removed from printable blank sheet 10, making objects 34 more presentable and suitable for use as marketing materials. The pattern of dry lift adhesive layer 46 allows for a stronger dry lift adhesive layer 46, while still allowing object 34 to be removed easily. As such, time is saved and tearing of objects 34 during removal from printable blank sheet 10 is reduced or eliminated. Film layer 44 making up a bottom of portions of objects 34 having dry lift portion 36 results in laminated portions of objects 34. Objects 34 are therefore stronger and moisture-resistant, making it possible to use objects 34 in harsher environments. Because adhesive layer 50 is exposed in the portion of object having adhesive portion 38, objects 34 have adhesive portions. Thus, objects 34 can be adhered to other portions of object 34, as in the case of objects 34 being wristbands, or to other surfaces. Objects 34 are more versatile because objects 34 have a bottom surface made up of film layer 44 and adhesive layer 50. Additionally, because portions of cover layer 52 extend past adhesive layer 50, oozing of adhesive due to high temperatures during the production of printable blank sheet 10 is prevented.

FIGS. 2A, 2B, and 2C show an example of objects 34 as wristbands. Wristbands can be removed from printable blank sheet 10 one at a time. The wristband is removed from dry lift portion of 36 of sheet 24 first, as indicated by indicia 25, by lifting the wristband from an area of dry lift adhesive layer 46 having a dead space and pulling the wristband away from printable blank sheet 10. The wristband is subsequently removed from gap portion 40 and adhesive portion 38 of sheet 24. After wristbands are removed from printable blank sheet 10, wristbands have a laminated portion and an adhesive portion separated by a gap. Wristbands can be wrapped around a wrist and exposed adhesive layer 50, making up adhesive portion, can be adhered to top surface 12 of dry lift portion 36 of sheet layer 24, which makes up laminated portion.

Prior wristband sheets have included a sheet layer with an adhesive layer and a cover layer attached to one end of the sheet. As a result, the end of the wristband sheet having the adhesive layer and the cover layer is substantially thicker than the rest of the wristband sheet. When wristband sheets are stacked for printing, the thicker ends of the wristband sheets create a thicker end of the stack of wristband sheets, or stack bias. When a wristband sheet from the stack is being feed into a printer, the unevenness across the stack results in printer jams. Printer jams disrupt the printing process, can be time-consuming to correct, and result in damaged wristband sheets. Because dry lift strip 26 and adhesive strip 28 have about the same thickness or only differ in thickness by 25 percent or less, printable blank sheet 10 has the same thickness across printable blank sheet 10 or a thickness that differs by 25 percent or less. As a result, stacks of printable blank sheets 10 have little or no stack bias, decreasing printer jams during the printing process.

Figures 3A, 3B, 3C:
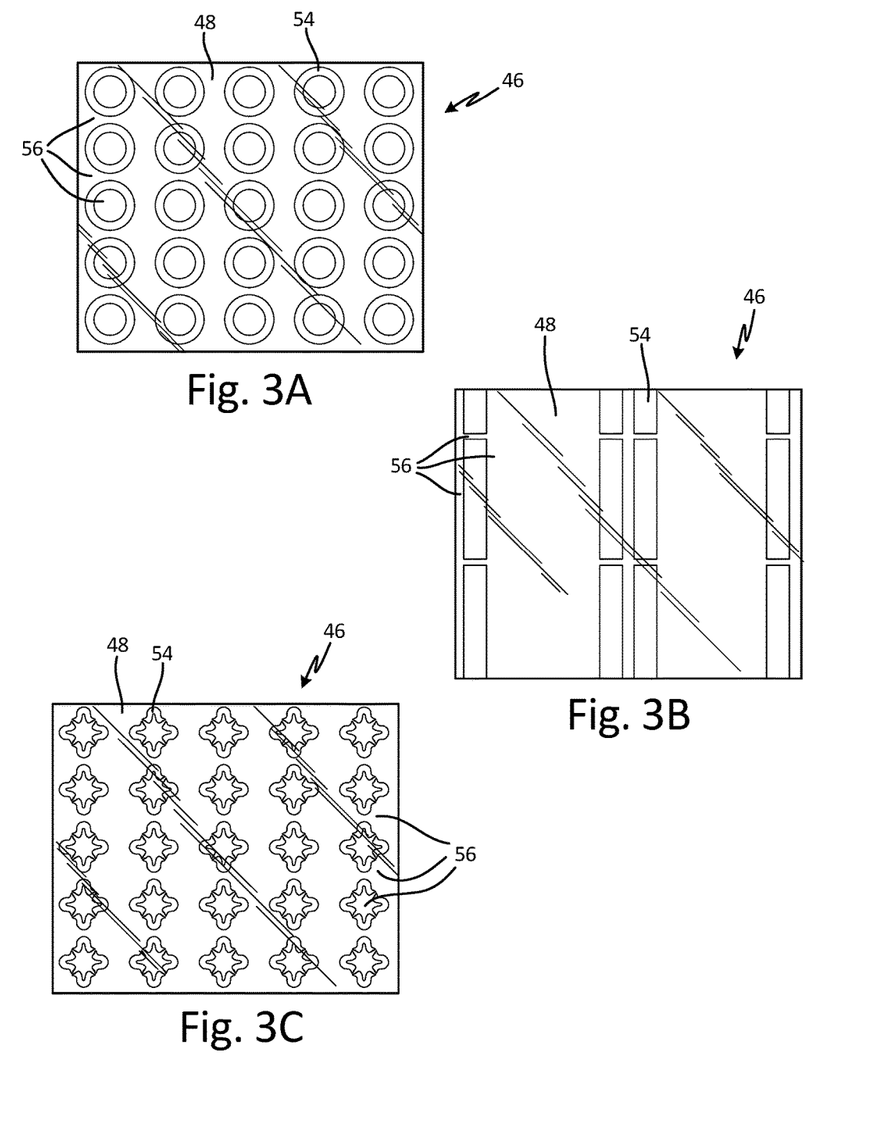
FIG. 3A is a top view of a first embodiment of a patterned laminating adhesive.
FIG. 3B is a top view of a second embodiment of the patterned laminating adhesive.
FIG. 3C is a top view of a third embodiment of the patterned laminating adhesive.

FIGS. 3A, 3B, and 3C show examples of dry lift adhesive layer 46 having different patterned laminating adhesives 54. FIG. 3A is a top view of a first embodiment of patterned laminating adhesive 54. FIG. 3B is a top view of a second embodiment of patterned laminating adhesive 54. FIG. 3C is a top view of a third embodiment of patterned laminating adhesive 54. FIGS. 3A, 3B, and 3C will be discussed together. FIGS. 3A, 3B, and 3C include adhesive layer 46 and backing film layer 48. Adhesive layer 46 includes patterned laminating adhesive 54 and dead space 56.

Patterned laminating adhesive 54 is a dry lift adhesive that is applied as a pattern to facilitate the easy removal of a film layer from backing film layer 48. Dead spaces 56 are the open spaces where patterned laminating adhesive 54 has not been applied.

As seen in FIG. 5A, patterned laminating adhesive 54 can be applied as a plurality of rings that are spaced apart. As seen in FIG. 5B, patterned laminating adhesive 54 can be applied with voided strips that are capable of being aligned with edges of an object with a complex shape. As seen in FIG. 5C, patterned laminating adhesive 54 can be applied as a plurality of V-shaped areas that are arranged in groups of fours and spaced apart.

Dead spaces 56 are positioned between and around patterned laminating adhesive 54. Dead spaces 56 are areas where patterned laminating adhesive 54 has not been applied. When a patterned laminating adhesive is used to connect two different layers of materials, dead spaces 56 provide areas where the layers can be pulled apart. This allows a user to begin to separate the layers along patterned laminating adhesive 54. Dead spaces 56 allow higher strength patterned laminating adhesives 54 to be used, as dead spaces 56 provide gaps in patterned laminating adhesive 54 so that different layers can be separated.

Figure 4A:
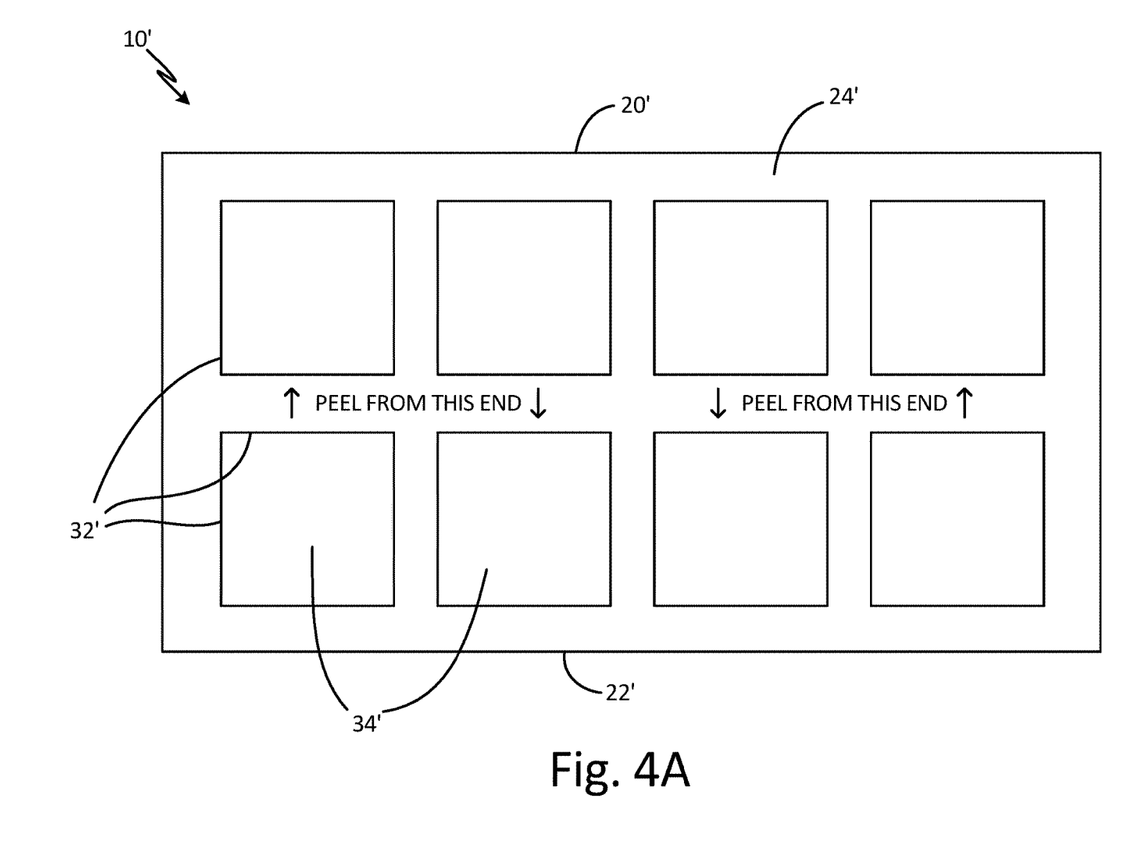
FIG. 4A is a top of view of a second embodiment of the printable blank sheet.
Figure 4B:
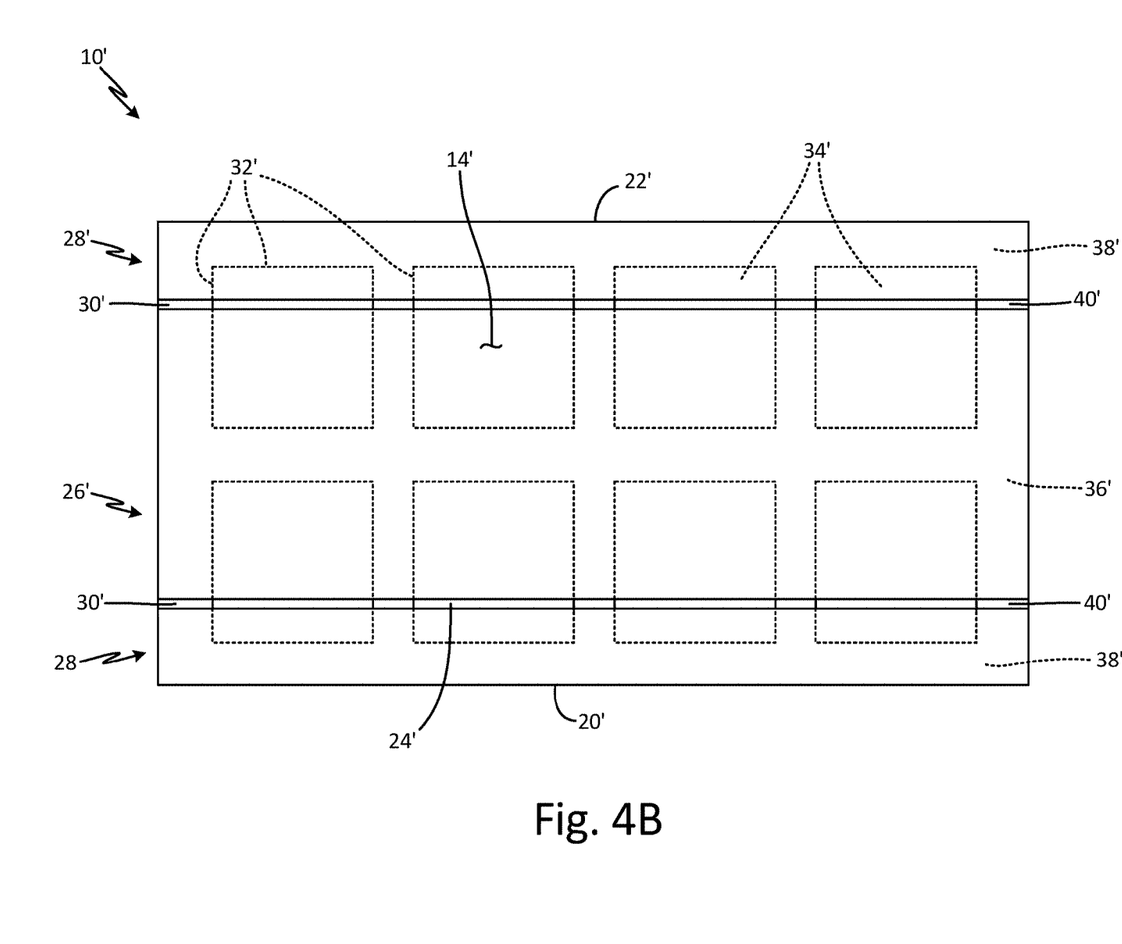
FIG. 4B is a bottom view of the second embodiment of the printable blank sheet.

FIG. 4A is a top of view of a second embodiment of printable blank sheet 10'. FIG. 4B is a bottom view of the second embodiment of printable blank sheet 10'. FIGS. 4A and 4B will be discussed together. Printable blank sheet 10' includes bottom surface 14' (shown in FIG. 4B), first side 20', second side 22', sheet layer 24', dry lift strip 26' (shown in FIG. 4B), adhesive strips 28' (shown in FIG. 4B), gaps 30' (shown in FIG. 4B), cut lines 32', and objects 34'. Sheet layer 24' includes dry lift portion 36', adhesive portions 38', and gap portions 40'.

Printable blank sheet 10' is the same as printable blank sheet 10 of FIGS. 1A-3C, except printable blank sheet 10' includes a plurality of adhesive strips 28' and a plurality of gaps 30', cut lines 32 define objects 34' of a different shape, and sheet layer 24' includes a plurality of adhesive portions 38' and a plurality of gap portions 40'. A first adhesive strip 28' extends along the bottom of sheet layer 24' along first side 20' of printable blank sheet 10' and a second adhesive strip 28' extends along the bottom of sheet layer 24' along second side 22' of printable blank sheet 10'. As such, the first adhesive strip 28' extends adjacent a first side of dry lift strip 26' and the second adhesive strip 28' extends adjacent a second side of dry lift strip 26' so that dry lift strip 26' extends between adhesive strips 28' along a middle portion of the bottom of sheet layer 24'. A bottom surface of dry lift strip 26' and bottom surfaces of adhesive strips 28' make up bottom surface 14' of printable blank sheet 10'. The thickness of the first adhesive strip 28' is about equal to the thickness of the second adhesive strip 20', and adhesive strips 20' are equal to or differ by 25 percent or less from the thickness of dry lift strip 26'. A first gap 30' is between the first adhesive strip 28' and dry lift strip 26' and a second gap 30' is between the second adhesive strip 28' and dry lift strip 26'. In alternate embodiments, printable blank sheet 10' includes only one gap 30' or no gaps 30'. In this embodiment, cut lines 32' define a periphery of objects 34', which are tags, in printable blank sheet 10'. In alternate embodiments, objects 34' may be any suitable object. Sheet layer 24' has a first adhesive portion 38' that the first adhesive strip 28' extends along and a second adhesive portion 38' that the second adhesive strip 28' extends along. A first gap portion 40' of sheet layer 24' is between the first adhesive portion 38' and the dry lift portion 36' and a second gap portion 40' is between the second adhesive portion 38' and the dry lift portion 36'. In alternate embodiments, sheet layer 24' includes one or no gap portions 40'.

Printable blank sheet 10' is produced by connecting dry lift strip 26' and adhesive strips 28' along the bottom of sheet layer 24'. Printable blank sheet 10' functions in a similar way and offers similar benefits as printable blank sheet 10. Objects 34', having exposed adhesive from one of adhesive strips 28', can be adhered to a surface using the exposed adhesive portion after object 34' has been removed from printable blank sheet 10'. For example, a laminated tag with an adhesive portion can be adhered to a shelf using the adhesive portion.

Printable blank sheets, such as 10 and 10' as described above, may include one or more adhesive strips 28 and one or more dry lift strips 26. Further, adhesive strips 28 and dry lift strips 26 may extend along the bottom of sheet layer 24 of printable blank sheet 10 or 10' in any suitable order or pattern. For example, adhesive strips 28 could run down a middle of printable blank sheet 10 and dry lift strips 26 could run along edges of printable blank sheet 10. The proportion of the length and width of adhesive strip 28 to the length and width of dry lift strip 26 within printable blank sheet 10 varies. Additionally, the proportion of adhesive strip 28 to dry lift strip 26 within objects 34 and 34' varies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A printable blank sheet comprising:
   a sheet layer;
   a dry lift strip extending along a bottom of the sheet layer;
   an adhesive strip extending along the bottom of the sheet layer adjacent the dry lift strip; and
   cut lines in the printable blank sheet that define a periphery of an object in the printable blank sheet;
   wherein a thickness of the dry lift strip is about equal to a thickness of the adhesive strip, and a bottom surface of the dry lift strip and a bottom surface of the adhesive strip make up a bottom surface of the printable blank sheet.

2. The printable blank sheet of claim 1, wherein a thickness of the dry lift strip differs from a thickness of the adhesive strip by 25 percent or less.

3. A printable blank sheet comprising:
   a sheet layer;
   a dry lift strip extending along a bottom of the sheet layer, the dry lift strip including:
      a pressure sensitive adhesive layer connected to the sheet layer;
      a film layer connected to the pressure sensitive adhesive layer;
      a dry lift adhesive layer connected to the film layer; and
      a backing film layer connected to the dry lift adhesive layer;
   an adhesive strip extending along the bottom of the sheet layer adjacent the dry lift strip, the adhesive strip including:
      an adhesive layer connected to the sheet layer; and
      a cover layer connected to the adhesive layer; and
   cut lines in the printable blank sheet that define a periphery of an object in the printable blank sheet.

4. The printable blank sheet of claim 3, wherein the dry lift strip extends along a dry lift portion of the sheet layer, and the adhesive strip extends along an adhesive portion of the sheet layer.

5. The printable blank sheet of claim 4, wherein cut lines extending through the dry lift portion of the sheet layer extend through the sheet layer, the pressure sensitive adhesive layer, the film layer, and the dry lift adhesive layer but not through the backing film layer, and cut lines extending through the adhesive portion of the sheet layer extend through the sheet layer and the adhesive layer but not through the cover layer.

6. The printable blank sheet of claim 3, wherein a thickness of the dry lift strip is about equal to a thickness of the adhesive strip.

7. The printable blank sheet of claim 3, wherein a thickness of the dry lift strip differs from a thickness of the adhesive strip by 25 percent or less.

8. The printable blank sheet of claim 3, wherein the pressure sensitive adhesive layer has a thickness between about 0.5 mil (0.0005 inch or 0.0127 millimeter) and about 2.0 mils (0.002 inch or 0.0508 millimeter), the film layer has a thickness between about 0.5 mil (0.0005 inch or 0.0127 millimeter) and about 1.0 mil (0.001 inch or 0.0254 millimeter), the dry lift adhesive layer has a thickness between about 0.25 mil (0.00025 inch or 0.00635 millimeter) and about 0.5 mil (0.0005 inch or 0.0127 millimeter), the backing film layer has a thickness between about 0.5 mil (0.0005 inch or 0.0127 millimeter) and about 5.0 mils (0.005 inch or 0.127 millimeter), the adhesive layer has a thickness between about 0.25 mil (0.00025 inch or 0.00635 millimeter and about 8 mils (0.008 inch or 0.2032 millimeter), and the cover layer has a thickness between about 1.0 mil (0.001 inch or 0.0254 millimeter) to about 6.0 mils (0.006 inch or 0.1524 millimeter).

9. The printable blank sheet of claim 3, wherein a bottom surface of the backing film layer and a bottom surface of the cover layer make up a bottom surface of the printable blank sheet.

10. The printable blank sheet of claim 3, further including a gap between the dry lift strip and the adhesive strip.

11. The printable blank sheet of claim 3, wherein the sheet layer has a top surface capable of being printed on.

12. The printable blank sheet of claim 3, wherein the dry lift strip extends from a first end of the blank to a second end of the blank, and the adhesive strip extends from the first end of the blank to the second end of the blank.

13. The printable blank sheet of claim 3, wherein the object can be removed from the dry lift strip by separating the object from the backing film layer along the dry lift adhesive layer, and the object can be removed from the adhesive strip by separating the object from the cover layer to remove the object from the printable blank sheet.

14. The printable blank sheet of claim 13, wherein when the object is removed from the printable blank sheet, the adhesive layer is exposed.

15. The printable blank sheet of claim 3, and further comprising a plurality of adhesive strips.

16. The printable blank sheet of claim 15, wherein a first adhesive strip is on a first side of the printable blank sheet and a second adhesive strip is on a second side of the printable blank sheet.

17. The printable blank sheet of claim 3, wherein the object is a wristband or a tag.

18. The printable blank of claim 3, wherein the pressure sensitive adhesive layer, the film layer, the dry lift adhesive layer, and the backing film layer of the dry lift strip are all the same width.

19. The printable blank of claim 3, wherein the cover layer of the adhesive strip is wider than the adhesive layer of the adhesive strip.

20. A method of creating a custom print object, the method comprising:
   running a printable blank sheet through a printer, the printable blank sheet including:
      a sheet layer;
      a dry lift strip extending along a bottom of the sheet layer, the dry lift strip including:
         a pressure sensitive adhesive layer connected to the sheet layer;
         a film layer connected to the pressure sensitive adhesive layer;
         a dry lift adhesive layer connected to the film layer; and
         a backing film layer connected to the dry lift adhesive layer;
      an adhesive strip extending along the bottom of the sheet layer adjacent the dry lift strip, the adhesive strip including:
         an adhesive layer connected to the sheet layer; and
         a cover layer connected to the adhesive layer; and
      cut lines in the printable blank sheet that define a periphery of an object in the printable blank sheet;
   separating the object from the backing film layer along the dry lift adhesive layer; and
   separating the object from the cover layer.

21. The method of claim 20, wherein a thickness of the dry lift strip is about equal to a thickness of the adhesive strip.

22. The method of claim 20, wherein the printable blank sheet has a plurality of adhesive strips.

23. The method of claim 20, and further including adhering the adhesive layer of the object to a top surface of a dry lift portion of the sheet layer.

24. The method of claim 20, and further including adhering the adhesive layer of the object to a surface to adhere the object to the surface.

* * * * *